US005480351A

United States Patent [19]

Coleman

[11] Patent Number: 5,480,351

[45] Date of Patent: Jan. 2, 1996

[54] THRESHING MACHINE ROTOR

[75] Inventor: David B. Coleman, Louisville, Ky.

[73] Assignee: Griffin & Company, Inc., Louisville, Ky.

[21] Appl. No.: 352,597

[22] Filed: Dec. 9, 1994

[51] Int. Cl.[6] ........ A01F 12/22

[52] U.S. Cl. ........ 460/72; 460/122

[58] Field of Search ........ 460/69, 71, 72, 460/121, 122

[56] References Cited

U.S. PATENT DOCUMENTS

| | | | |
|---|---|---|---|
| 2,321,019 | 6/1943 | Dray | 460/71 |
| 5,254,036 | 10/1993 | Johnson et al. | 460/71 |

FOREIGN PATENT DOCUMENTS

| | | | |
|---|---|---|---|
| 0097988 | 1/1984 | European Pat. Off. | 460/72 |

*Primary Examiner*—Terry Lee Melius
*Attorney, Agent, or Firm*—Wood, Herron & Evans

[57] ABSTRACT

A disc-type rotor assembly for a threshing machine in which threshing teeth are maintained in their preferred generally radial direction by spacers which are inserted between the rotor discs and extend the full circumferential length between threshing teeth mounting locations on the rotor discs.

20 Claims, 3 Drawing Sheets

64
64
56
56
56
64
56
38

50
48
48
50
50
36

THRESHING MACHINE ROTOR

FIELD OF THE INVENTION

The present invention relates generally to threshing machines, and, more particularly, the invention provides an improved threshing machine rotor assembly.

BACKGROUND OF THE INVENTION

Threshing machines of the type described herein are often used to separate the stem of a leaf from the lamina portions of the leaf. Preferably, the stem should be separated from the rest of the leaf with a minimum of damage to the lamina and providing the largest possible lamina pieces. The above process is generally executed using a series of threshing machines in which the first machines have a rotor which rotates relatively slowly and has relatively widely spaced teeth radially extending from the rotor which are effective to tear the largest pieces of lamina from the leaf stem. The separated pieces of lamina and remaining feedstock pass through relatively large openings of a semicircular screen or basket which is beneath and in close proximity to the ends of the threshing teeth. The separated pieces of lamina and remaining feedstock are then conveyed to a separating machine. The larger lamina pieces which are lighter than the remaining heavier feedstock are separated from the feedstock and collected. The remaining portions of the leaf together with its stem then pass to a successive threshing stage in which the threshing rotor rotates at a slightly greater velocity and has a greater number of threshing teeth extending radially therefrom with lesser spaces between the teeth. Further, the openings in the screen or basket are smaller. This stage of threshing is effective to remove smaller pieces of lamina from the leaf stem which are conveyed to a downstream separator stage in which the loose smaller pieces of lamina are separated from the remaining stem and collected. The processes of threshing, separating and collecting successively smaller pieces of lamina are repeated with successive threshing machine stages each having a threshing rotor rotating successively faster and having a successively greater number of more closely spaced, radially extending threshing teeth.

Threshing machines of the above type may have threshing rotors that range in length from three feet to twelve feet. Further, the threshing rotors may have a center body which is up to sixteen inches in diameter, and threshing teeth may radially extend from the center body an additional five inches. The larger threshing rotors may weigh up to two tons. There are basically two designs for connecting the radially extending threshing teeth to the threshing rotor. With the first, or fixed tooth position design, parallel pairs of ears are welded to the outer cylindrical surface of the center body of the thresher rotor. The threshing teeth are inserted between the welded mounting ears and are held in place by a bolt which extends through the mounting ears and the threshing tooth in a direction that is generally parallel to the longitudinal axis of the threshing rotor. Consequently, the tooth has a degree of freedom, that is, it can rotate or pivot about the mounting bolt in a plane perpendicular to the longitudinal axis of the threshing rotor. To prevent that rotation, one of two mechanisms may be used.

The first mechanism requires that a keystock such as a small rectangular bar be welded to an edge of the mounting ears adjacent both of the longitudinal edges of the threshing tooth so that the welded keystocks prevent the threshing tooth from pivoting in the plane perpendicular to the axis of the threshing rotor and support the threshing tooth in the desired radial direction with respect to the threshing rotor. However, if, in the threshing process, the tooth encounters a hard object; and an excessive force is applied to the threshing tooth in a direction opposite the direction of angular rotation of the threshing rotor, the keystock supporting the tooth which is subject to that excessive force will break away thereby permitting the threshing tooth to rotate about the mounting bolt. The break-away action of the keystock protects the threshing tooth and threshing rotor and the adjacent basket from excessive damage.

Another mechanism for preventing the threshing tooth from pivoting about the mounting bolt and holding the threshing tooth in the generally radial direction is to provide a notch in the outermost ends of the mounting ears, and to locate a shear pin that extends through the threshing tooth in those notches. Consequently, if the threshing tooth is subjected to an excessive force in opposition to the direction of the rotation of the threshing rotor, the shear pin will break. Therefore, the shear pin prevents excessive damage to the threshing tooth, the threshing rotor and the basket.

Threshing rotors of the above fixed tooth position design have an advantage in that damaged threshing teeth may be easily replaced because each tooth is individually secured into place with a very accessible mounting bolt. However, the mounting ears for the threshing teeth are welded in place on the threshing rotor, and, therefore, the relative positions of the threshing teeth are fixed. Consequently, the design has the disadvantage of being inflexible in rearranging the threshing teeth in different patterns. Further, in order to remove and insert the mounting bolt through the mounting ears there must be a predetermined clearance space between adjacent sets of mounting ears. Consequently, the design has a disadvantage in limiting the density of threshing teeth on the threshing rotor. The above limitations on the placement and density of threshing teeth limits the applications of the above-described fixed tooth position threshing rotor. For example, the fixed tooth position threshing rotor may be used in the first and sometimes second threshing stages, but is generally not applicable to a third and subsequent threshing stages.

To overcome the disadvantages of the fixed tooth position threshing rotor, the disc-type threshing rotor was developed. With this design, the threshing rotor is comprised of a plurality of adjacent ring-like rotor discs which slide over and are stacked together on a cylindrical center body. Each rotor disc has a plurality, for example, six, threshing teeth-mounting locations. The mounting locations are defined by an equal number of circumferentially spaced holes close to the outer periphery of the rotor disc. The rotor discs are mounted on the center body so that all of the holes are in longitudinal and axial alignment with respect to the thresher rotor. Any pattern of threshing teeth may be achieved by placing the threshing teeth at selected mounting locations between the rotor discs. There are six circumferential threshing tooth locations on each threshing disc; and further, with the 0.25 inch thick rotor discs being separated by a spacing therebetween of 0.25 inches, threshing teeth may be located at any 0.500 inch increment over the length of the threshing rotor. The essentially no practical limitation on the spacing between threshing teeth or the pattern in which the threshing teeth are arranged.

The threshing teeth are pivotally held in position by rods that extend through mounting holes in all of the threshing discs. The ends of the rods are secured against the end plates which in turn are connected to end shafts. As described, with respect to the fixed tooth position threshing rotor, the threshing teeth can be held and supported in a generally radial direction by a pair of keystocks welded on one side of the rotor disc at each of the tooth mounting locations. Consequently, by locating the threshing teeth between pairs of welded keystocks, the threshing teeth are supported and held in the desired radially orientation. As described above, if an excessive force is applied to the edge of the threshing tooth in a direction opposite the direction of rotation of the threshing rotor, that excessive force will fracture and break the keystock receiving the force. Therefore, the threshing tooth is permitted to pivotally rotate about the mounting shaft thereby protecting it and the threshing rotor from excessive damage.

While the above disc-type threshing rotor design provides practically infinite flexibility in the placement of threshing teeth, the replacement of damaged threshing teeth and broken keystocks is substantially more difficult. As will be appreciated, welding a new keystock in its proper location within the 0.250 inch spacing between adjacent rotor discs is very difficult. Alternatively, disassembly of the rotor to replace broken keystrokes is difficult, time consuming and expensive. Consequently, under the pressures of production, instead of replacing the broken keystock, a new or existing threshing tooth is often welded to an adjoining rotor disc.

The above disc-type rotor design may also utilize the shear pintype of construction in which notches are cut into the outer peripheral edge of each of the rotor discs adjacent the mounting holes. Therefore, rotor teeth having shear pins inserted therein are disposed between the rotor discs and the shear pin is located in the peripheral notches. Once again, an excessive force on the shearing tooth will shear the pin and permit the shearing tooth to pivot with respect to the mounting shaft. While the shear pin design with the disc-type roller has the advantages of a practically infinite flexibility with regard to placement of the threshing teeth, and further eliminates the problems associated with replacing keystocks, the design has proven to have the disadvantage of being susceptible to too frequent breakage of the shearing pin. The shear pin design is further complicated because spacing washers are used between the rotor discs at those tooth mounting locations where no teeth are mounted. Therefore, to replace a broken shear pin or threshing tooth, when the threshing tooth mounting shafts is removed and reinserted, spacing washers, shear pins and threshing teeth must be handled and maintained in alignment.

Both the keystock and shear pins designs have a further disadvantage in that when they absorb the energy of an excessive force and break, pieces of metal are separated from the threshing rotor. Those pieces could lodge and wedge within the rotor assembly; they could find their way into and damage other mechanical components or they could enter the feedstock and require separation. In any event, it is undesirable for the threshing rotor components to break into separate pieces.

SUMMARY OF THE INVENTION

To overcome the disadvantages described above, the present invention provides a disk-type threshing rotor which has the advantage of being able to locate the threshing teeth in any pattern but eliminates the problems associated with replacing broken keystocks and shear pins. Further, the disk-type threshing rotor of the present invention permits the threshing teeth to yield from excessive forces with little potential for deformed parts to break loose and drop into the machinery or the feedstock. Further, if excessive forces have damaged a threshing tooth and its supporting elements, the damaged threshing tooth and elements may be repaired more easily in the field without the need of welding equipment or other special tools. Therefore, the threshing rotor of the present invention can more easily be kept maintained so that it is functioning at its full capability and efficiency which ultimately reduces its operating costs.

According to the principles of the present invention and in accordance with the described embodiments, the present invention provides a threshing machine rotor assembly having of a series of immediately adjacent rotor discs in which each disc has a plurality of threshing teeth locations. A predetermined pattern of threshing teeth is created by locating threshing teeth at selected ones of the threshing teeth locations. The threshing teeth are supported and maintained in a generally radially orientation with respect to the threshing rotor by spacers which are inserted between adjacent discs and which extend between the entire circumferential space between the threshing teeth locations.

The above construction has the advantage of flexibility in placing the threshing teeth in any desired pattern around the threshing rotor. In addition, the spacers secure the teeth without the requirement of welding and further provide a greater deformation resistance than is typically provided by the shear pin construction. Further, in the case where excessive forces on the threshing teeth cause the teeth to rotate about the tooth mounting shaft, the spacer will deform and not break into different pieces, thereby minimizing the probability of further damage to the machinery and contamination of the feedstock. The damaged spacers of the present invention may be removed without having to disassemble or remove the threshing teeth and are simply pulled out of the rotor assembly.

In a further aspect of the invention, each of the spacers has a body member that is generally shaped to match an area of the rotor disc segment that is between the threshing teeth locations. The body member has two yieldable or ductile side members with outer edges extending along facing or opposed edges of adjacent ones of the threshing teeth mounting locations. The yieldable side members have an outer directed surface which abuts against one side of a threshing tooth. A yieldable base member is connected between ends of the side members. The yieldable members of the spacer body are made from a ductile material so that they deform in response to a rotation of the threshing tooth which they contact.

In a further aspect of the invention, the spacer body member includes a yieldable bridge member connected between the other ends of the yieldable side members to form a generally quadrilaterally shaped spacer. Further, a centrally located yieldable mounting member extends between the yieldable base and bridge members. The mounting member contains a mounting hole through which a spacer mounting shaft is inserted to pivotally mount the spacer in its desired location.

These and other objects and advantages of the present invention will become more readily apparent during the following detailed description in conjunction with the drawings herein.

DETAILED DESCRIPTION OF THE INVENTION

Figure 1:
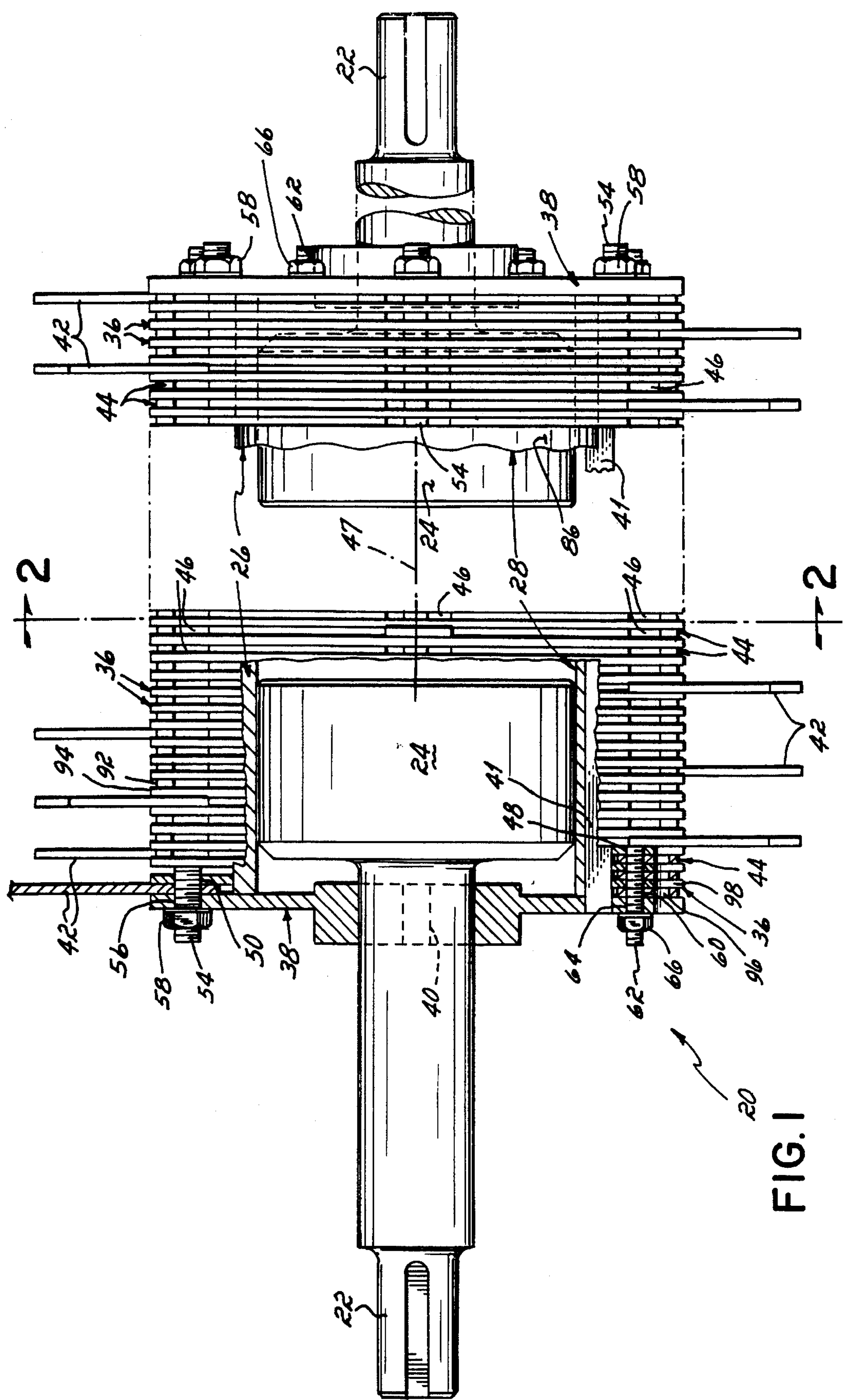
FIG. 1 is a broken away side view partially in cross-section of a threshing rotor assembly.

FIG. 1 illustrates an assembly of a threshing machine rotor 20 which utilizes the construction of the present invention. In a manner well known, the threshing machine rotor is rotatably mounted within a threshing machine (not shown) and is connected to a rotary drive by one or the other of the ends of drive shafts 22. The other ends of the drive shafts 22 have larger diameter shafts 24 which are sized to fit the internal diameter of a tube 26. The larger shafts 24 are welded in the ends of the tube 26 and form an integral center body 28 of the threshing machine rotor 20.

Figure 5:
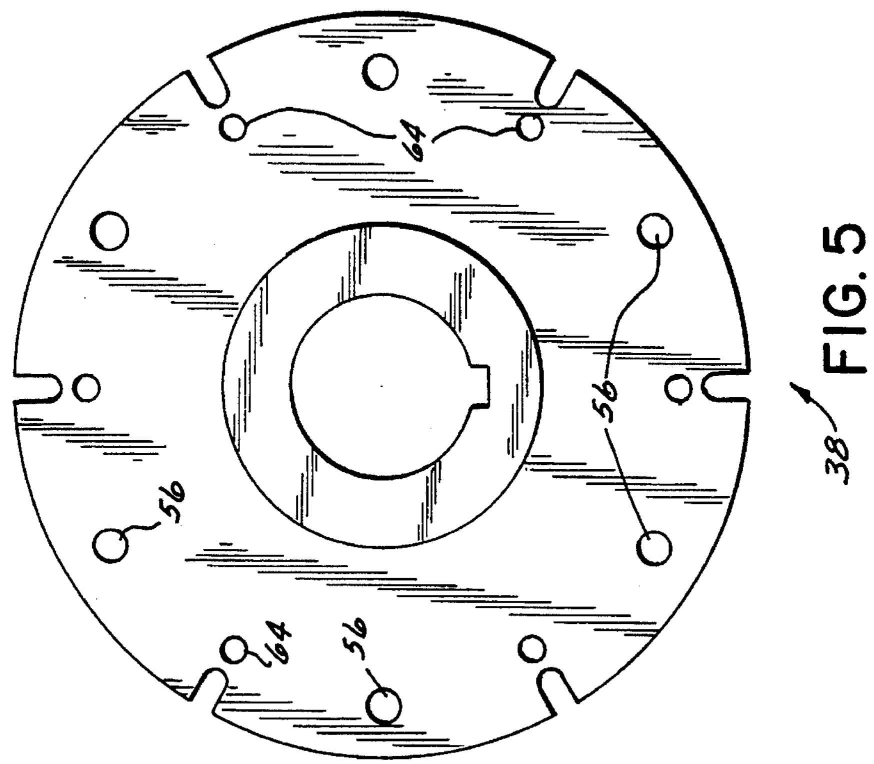
FIG. 5 is a plan view of the rotor end plates of the rotor assembly.
Figure 4:
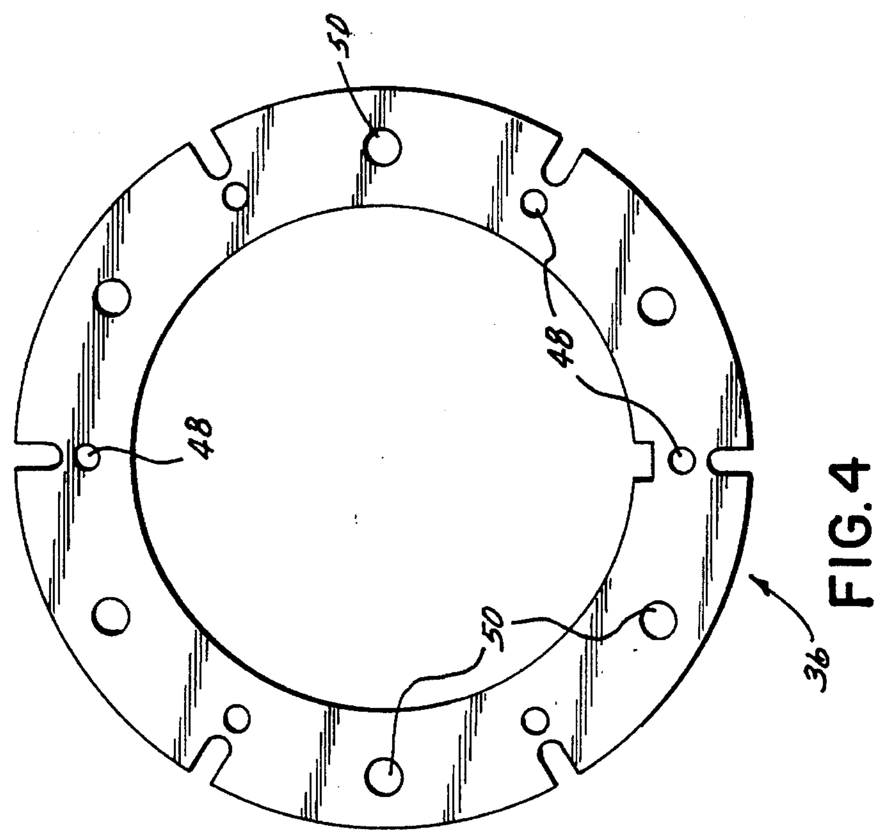
FIG. 4 is a plan view of the rotor disks of the rotor assembly.

A plurality of rotor discs 36 (FIG. 4) are slid over the tube 24 and stacked side by side until the discs 36 extend over the full length of the center body 28 between end plates 38 (FIG. 5). The end plates 38 are fixed in a rotational position with respect to the drive shafts 22 by means of a key 40. Similarly, preferably the rotor discs 36 are fixed in an angular orientation with respect to the center body 28 by a key 41.

Preferably, the rotor discs 36 have a thickness of approximately 0.25 inches and preferably have the identical spacing between each of the discs. Depending on the nature of the threshing application, that is the physical characteristics of the feedstock to be threshed, as well as the threshing stage, it is desired that the threshing rotor 20 be assembled to have a predetermined pattern of threshing teeth 42 along its length. The pattern of threshing teeth may be, for example, a helical pattern, or straight rows of threshing teeth, or rows of threshing teeth in which the teeth are in alternate locations with each row. The threshing teeth 42 are preferably 0.25 inches thick and are located in the spacing between the rotor discs 36. To further maintain rotor disc spacing, the present invention utilizes spacers 44 which also have the desired 0.25 inch thickness.

Figure 2:
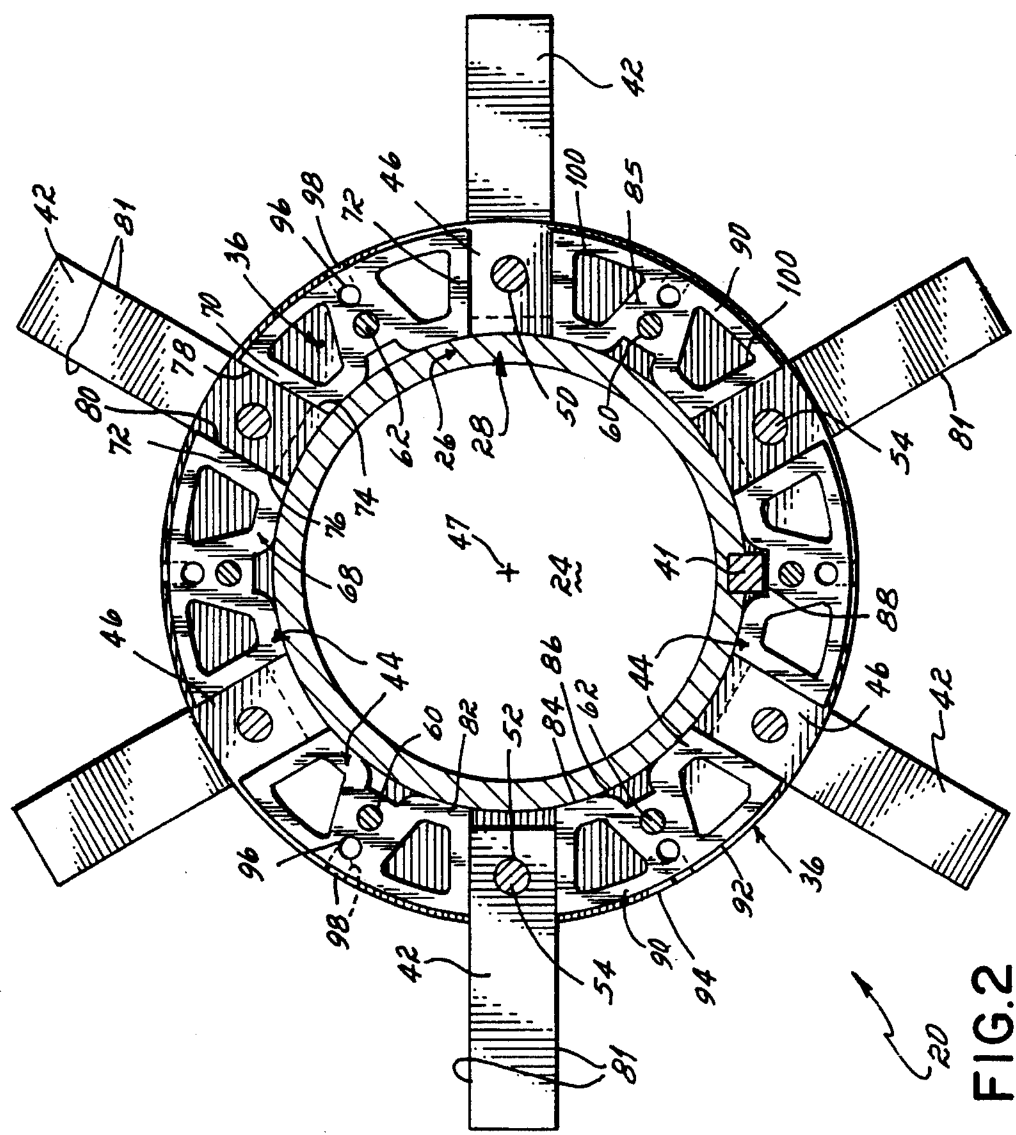
FIG. 2 is a cross-sectional view taken generally along line 2—2 of FIG. 1 and illustrates the assembly of the spacers with respect to a rotor disc.

As shown in FIG. 2, each of the rotor discs 36 has a plurality of potential threshing teeth mounting locations 46. Further, it is preferable that the threshing teeth 42 be supported and maintained so that they project outwardly from the center body 28 in a generally radial direction with respect to an axis of rotation 47 of the center body 28. As shown in FIG. 2, the spacers 44 extend between and over the complete circumferential distance between the tooth mounting locations 46.

The plurality of rotor discs 36 have a plurality of spacer mounting holes or first holes 48 that are equally spaced around the circumference of the rotor discs 36. In addition, the rotor discs 36 have a plurality of tooth mounting holes or second holes 50 that are equally spaced between the first holes 48 and extend generally centrally through the tooth mounting locations 46. Each of the threshing teeth 42 has a mounting hole 52 which mates with each of the plurality of second holes 50 in the rotor discs 36 when the threshing tooth 42 is properly located at the tooth mounting location 46. A plurality of first shafts 54 extend through the second holes 50 of all of the rotor discs 36 and also extend through the mounting holes 52 of the threshing teeth 42 which have been placed at their desired location. The threshing teeth mounting shaft 54 extends through mating holes 56 of the end plates 38, and nuts or other fasteners 58 are attached to the ends of the first shafts 54 thereby clamping or securing the components of the thresher rotor 20 together as a unit. Therefore, the threshing teeth mounting shafts 54 are effective to pivotally support the threshing teeth 42 at a first radial distance from the axis of rotation 47.

Each of the spacers 44 has a mounting hole 60 which, when the spacers 44 are placed in their desired positions between the tooth mounting locations 46, mate with the first holes 48 in the rotor discs 36. A plurality of spacer mounting shafts 62 extend through the first holes 48 of the rotor discs 36 and the mounting holes 60 of the spacers 44 to pivotally mount the spacers 44 thereon. The spacer mounting shafts, or second shafts 62 extend through mating holes 64 of the end plates 38 and nuts, cotter pins or other fasteners 66 are attached to the ends of the spacer mounting shafts 62.

Figure 3:
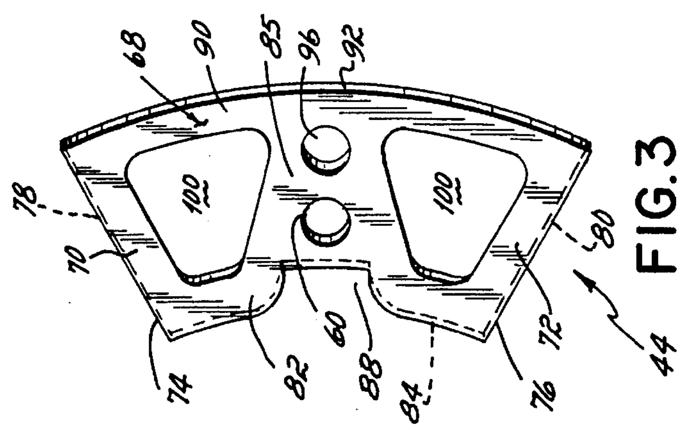
FIG. 3 is a perspective view of a single spacer.

Preferably, the spacers 44 as shown in FIG. 3 have a body member 68 made from a malleable or ductile material. The spacer body member 68 has first and second yieldable side members 70, 72 which have respective outer edges 74, 76 that extend along facing or opposed edges of the mounting tooth locations 46. Further, the yieldable side members 70, 72 have respective outer directed surfaces 78, 80 which abut up against adjacent side surfaces 81 of the threshing teeth 42. The spacer body 68 further has a yieldable base member 82 which extends between commonly oriented ends of the side members 70, 72. The base member 82 has an outer directed surface 84 which is generally shaped to mate with the outer cylindrical surface 86 of the center body 28. Further, the yieldable base member 82 has a notch 88 which is generally centrally located in the base member 82 and is sized to receive the key 41 located between the center body 28 and the discs 36.

The spacer body member 68 further has a yieldable bridge member 90 which extends between the opposite ends of the side members 70, 72. The yieldable bridge member 90 has an outer directed, generally arcuate longitudinal edge 92 which is shaped generally to match the outer periphery 94 of the rotor discs 36. The body member 68 further has a yieldable mounting member 85 which extends between and is connected at a generally central location to the base and bridge members 82, 90, respectively. The body member has the mounting hole 60 and further has a second hole, or hook hole, 96 which is located between the mounting hole 60 and the peripheral edge 92 of the bridge member 90. The discs 36 have a plurality of notches or slots 98 which are located at the intersection of the mounting and base members 85, 82 and match the location of the hook holes 96 in the spacer body members 68. The notches 98 provide a clearance so that a hook-like tool can be disposed in the slots 98, inserted into the hook hole 96 and used to pull out the spacer 44.

The illustrated geometric shape of the spacer 44 in FIG. 3 has been determined by experimentation to be a preferable shape. The spacer 44 should preferably provide a greater resistance to deformation than is typically provided by shear pin and should have a deformation resistance that is comparable to welded keystocks. The body member 68 of the spacers 44 has identical openings 100 on each side of the mounting hole 60 which are generally quadrilateral and approximately trapezoidal in shape. The openings 100 first reduce the weight of the spacer 44, and further, provide a width of the yieldable members 70, 72, 82, 85, 90 such that a force comparable to that required to break a welded keystock is required to deform those yieldable members.

In use, after the threshing rotor is completely assembled, it is inserted in a threshing machine. If, in use, any one of the threshing teeth 42 encounter a force having a substantial force component in a direction opposite the direction of rotation of the threshing rotor 20, that threshing tooth will pivot with respect to the mounting shaft 54 and deform the yieldable members of the spacers 44 adjacent to that tooth. To replace those deformed spacers, the appropriate spacer mounting shafts 62 are removed from the threshing rotor 20 until the damaged spacers are released from the shafts 62. A hook tool is then inserted in the slots 98 of the rotor discs 36 and hooked into the holes 96. The spacers 44 are then pulled out and removed from the threshing rotor assembly. The pivoted threshing tooth is then reoriented in a radial direction, and new spacers are inserted between the adjacent rotor disc 36 and threshing teeth locations 46. Consequently, the damaged spacers 44 can be replaced without having to disassemble the threshing rotor 20. In addition, the threshing tooth which was subject to the excessive force may not be damaged and does not have to be removed in order to replace the spacers and reorient the tooth. Further, the spacers 44 may be replaced in the field without special equipment or without having to perform difficult repair tasks, such as, for example, rewelding a keystock back into place.

The spacers 44 of the present invention may be flame-cut from the same 0.250 inch thick steel plate from which the thresher discs 36 are made. Preferably, the spacers 44 should fit snugly against the threshing teeth 42. Therefore, the tolerance relating to the length of the spacers 44 between the edges 74, 76 is important and should be maintained at ±0.010 inches. In addition, the spacers 44 should rest evenly against the sides 81 of the teeth 42 and the outer cylindrical surface 86 of the center body 28. Therefore, the manufacturing of the outer directed surface 84 of the base member 82 and the outer directed surfaces 78, 80 of respective side members 70, 72 should be maintained to the same ±0.010 inch tolerance. To obtain the preferred tolerances, the outer directed surfaces 78, 80 of the respective side members 70, 72 and the outer directed surface 84 of the base member 82 are manufactured by a punching process. If the preferred tolerance is exceeded, the spacer 44 will not snugly fit against the threshing teeth 42 and surface 86 of center body 28; and the spacers 44 will have a tendency to pivot and vibrate with respect to the mounting shafts 62. That vibration produces an annoying noise, and further, will accelerate the wear of the spacers 44 and the threshing teeth 42 at a rate greater than if the spacers 44 are more snugly fit in place. The holes 60, 96 are preferably punched, and the other profiles of the spacers 44 are preferably made by flame cutting.

While the invention has been set forth by a description of the embodiment in considerable detail, it is not intended to restrict or in any way limit the claims to such detail. Additional advantages and modifications will readily appear to those who are skilled in the art. Accordingly, departures may be made from the details described herein without departing from the spirit and scope of the invention.

What is claimed is:

1. A threshing machine rotor assembly of the type used for separating a leaf stem from a leaf, the threshing machine rotor assembly comprising:

- a plurality of rotor discs located immediately adjacent each other and defining between them a plurality of threshing teeth locations,
- a plurality of teeth located with respect to selected ones of the threshing teeth locations of the plurality of rotor discs;
- a plurality of spacers removably disposed between adjacent ones of the plurality of rotor discs, the plurality of spacers extending between and from one to the other of the threshing teeth mounting locations on the plurality of rotor discs.

2. The threshing machine rotor assembly of claim 1 wherein each of the plurality of spacers further comprise a plurality of yieldable members connected to form a quadrilateral generally wedge shaped member.

3. A threshing machine rotor assembly of the type used for separating a leaf stem from a leaf, the threshing machine rotor assembly comprising:

- a generally cylindrical center body;
- a pair of end plates mounted on opposite ends of the center body;
- a plurality of rotor discs mounted immediately adjacent each other on the center body between the pair of end plates, each of the plurality of rotor discs having
  - a plurality of first holes generally circumferentially and equally spaced around a circumference of the rotor disc, and
  - a plurality of second holes generally equally spaced between the plurality of first holes;
- a plurality of teeth located with respect to selected ones of the plurality of rotor discs, each of the plurality of teeth having a mounting hole being in general alignment with selected ones of the plurality of second holes;
- a plurality of first shafts extending through the plurality of second holes in the rotor discs and the mounting holes in the plurality of teeth, each of the plurality of first shafts being secured at its ends against the pair of end plates, the plurality of first shafts first, pivotally supporting the plurality of teeth at a first radius with respect to a center of the rotor discs, and second, locating the plurality of rotor discs with respect to each other and the pair of end plates;
- a plurality of spacers located circumferentially around outer peripheries of and between the plurality of rotor discs, each of the plurality of spacers having a plurality of yieldable members connected to form a generally quadrilaterally shaped member having an edge surface abutting against a side of one of the plurality of teeth; and
- a plurality of second shafts extending through the mounting holes in the plurality of spacers and the plurality of first holes in the plurality of rotor discs, the plurality of second shafts pivotally supporting the plurality of spacers with respect to the rotor discs.

4. The threshing machine rotor assembly of claim 3 wherein each of the plurality of rotor discs further includes a plurality of slots generally equally spaced around the circumference of the rotor disc and proximate the plurality of first holes.

5. The threshing machine rotor assembly of claim 4 wherein each of the spacers further comprises a second hole generally proximate the mounting hole and oriented to align with the plurality of slots in the rotor discs upon the spacer being located with respect to a rotor disc.

6. The threshing machine rotor assembly of claim 5 wherein the first hole in the spacers is located a radial distance from a center axis of the center body that is less than a radial distance defining the location of the second holes in the rotor discs.

7. A threshing machine rotor spacer adapted to be mounted in a threshing machine rotor assembly, the rotor assembly further includes a plurality of threshing teeth and a plurality of rotor discs having a plurality of threshing teeth mounting locations in axial alignment along the rotor assembly, the plurality of threshing teeth being located at selected ones of the plurality of threshing teeth locations on the plurality of rotor discs, the threshing machine rotor spacer comprising:

a spacer body member adapted to be located circumferentially between adjacent ones of the plurality of threshing teeth mounting locations on adjacent ones of the plurality of rotor discs, the spacer body further including two yieldable side members providing two outer edges extending along opposed edges of adjacent ones of the plurality of threshing teeth mounting locations, each of the yieldable side members providing an outer directed surface which is adapted to abut against a side of one of the plurality of teeth;

a yieldable base member having ends connected to commonly oriented ends of the two yieldable side members; portions of the yieldable members deforming in response to a rotation of the one of the plurality of teeth.

8. A threshing machine rotor spacer adapted to be mounted in a threshing machine rotor assembly, the threshing machine rotor assembly further includes a plurality of threshing teeth and a plurality of rotor discs having a plurality of threshing teeth mounting locations in longitudinal alignment along the rotor assembly, the plurality of threshing teeth being mounted at selected ones of the plurality of threshing teeth locations on the plurality of rotor discs, the threshing machine rotor spacer comprising:

a spacer body member adapted to be located circumferentially between adjacent ones of the plurality of threshing teeth mounting locations on adjacent ones of the plurality of rotor discs, the spacer body further including two yieldable side members providing two outer longitudinal edges extending along facing edges of adjacent ones of the plurality of threshing teeth mounting locations, each of the yieldable side members providing an outer directed surface which is adapted to abut against a side of one of the plurality of teeth;

a yieldable base member having ends connected to first commonly oriented ends of the two yieldable side members; and a yieldable bridge member connected to opposite ends of the two yieldable side members; portions of the yieldable members deforming in response to a rotation of the one of the plurality of teeth.

9. The threshing machine rotor spacer of claim 8 further comprising a yieldable mounting member extending between the base member and the bridge member, the yieldable mounting member having mounting hole for pivotally mounting the rotor spacer.

10. The threshing machine rotor spacer of claim 9 wherein the yieldable mounting member further including a hook hole located between the mounting hole and the bridge member, the hook hole facilitating removal of the rotor spacer.

11. The threshing machine rotor spacer of claim 8 wherein the threshing machine rotor spacer is generally wedge shaped.

12. The threshing machine rotor spacer of claim 8 wherein the plurality of rotor discs are mounted on a center body having a cylindrical outer surface and the yieldable base member further comprises an outer directed generally arcuate longitudinal edge.

13. The threshing machine rotor spacer of claim 12 wherein the yieldable base member further comprises an outer directed surface generally shaped to mate with the outer cylindrical surface of the center body.

14. The threshing machine rotor spacer of claim 8 wherein the yieldable bridge member further comprises an outer directed generally arcuate longitudinal edge.

15. The threshing machine rotor spacer of claim 14 wherein the yieldable bridge member further comprises an outer directed generally longitudinal edge generally shaped to match an outer periphery of the plurality of rotor discs.

16. The threshing machine rotor spacer of claim 9 wherein outer directed surface of the yieldable base member further includes a notch adapted to receive a key extending from the outer cylindrical surface of the center body.

17. The threshing machine rotor spacer of claim 16 wherein the notch is generally located at the intersection of the yieldable base member and the yieldable center member.

18. A threshing machine rotor disc adapted to be supported within a rotating threshing machine rotor assembly, the rotor assembly further having a pair of end plates nonrotationally mounted to opposite ends of a center body, a plurality of first shafts connected at their ends to the pair of end plates, the plurality of first shafts extending through mounting holes in a plurality of threshing teeth for pivotally supporting the plurality of threshing teeth, the threshing machine rotor disc comprising:

a ring member having an inner opening sized to slide over the center body including a plurality of first holes generally equally spaced with respect to each other, each of the plurality of first holes having a first radial displacement from an axis of rotation of the thresher rotor assembly, and each of the plurality of first holes adapted to receive one of a plurality of second shafts pivotally supporting a spacer with respect to the threshing machine rotor disc;

a plurality of notches, each of the plurality of notches intersecting a periphery of the ring member and being generally in radial alignment with one of the plurality of first holes; and a plurality of second holes, each of the plurality of second holes having a second radial displacement from the axis of rotation of the thresher rotor assembly greater than the first radial displacement, and each of the plurality of second holes adapted to receive one of the plurality of first shafts for locating one of the plurality of threshing teeth with respect to the threshing machine rotor disc.

19. A threshing machine rotor disc adapted to be supported within a threshing machine rotor assembly, the rotor assembly further having a pair of end plates nonrotationally mounted to opposite ends of a center body, a plurality of first shafts connected at their ends to the pair of end plates, the plurality of first shafts extending through mounting holes in a plurality of threshing teeth for pivotally supporting the plurality of threshing teeth, the threshing machine rotor disc comprising:

a ring member having an inner opening sized to slide over the center body including a plurality of first holes being generally equally spaced with respect to each other, each of the plurality of first holes adapted to receive one of a plurality of second shafts for pivotally supporting a spacer with respect to the threshing machine rotor disc;

a plurality of slots generally equally spaced around the outer periphery of the ring member and being proximate to the plurality of first holes and a plurality of second holes generally equally spaced between the plurality of first holes, each of the plurality of second holes adapted to receive one of the plurality of first shafts for locating one of the plurality of threshing teeth with respect to the ring member.

20. The threshing machine rotor disc of claim 19 wherein the plurality of first holes are radial displaced from an axis of rotation of the center body a distance less than a radial displacement the plurality of second holes.

* * * * *